US011194525B2

(12) United States Patent
Takamoto

(10) Patent No.: US 11,194,525 B2
(45) Date of Patent: Dec. 7, 2021

(54) METHOD OF CONTROLLING INFORMATION PROCESSING APPARATUS AND STORAGE MEDIUM STORING PROGRAM TO SET AN IP ADDRESS FOR A DEVICE SUITABLE FOR NETWORK ENVIRONMENT

(71) Applicant: SEIKO EPSON CORPORATION, Tokyo (JP)

(72) Inventor: Akio Takamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/901,214

(22) Filed: Jun. 15, 2020

(65) Prior Publication Data

US 2020/0394000 A1 Dec. 17, 2020

(30) Foreign Application Priority Data

Jun. 17, 2019 (JP) .............................. JP2019-111747

(51) Int. Cl.
*G06F 3/12* (2006.01)
*H04L 29/12* (2006.01)

(52) U.S. Cl.
CPC .......... *G06F 3/1204* (2013.01); *G06F 3/1231* (2013.01); *G06F 3/1254* (2013.01); *H04L 61/2007* (2013.01); *H04L 61/6068* (2013.01)

(58) Field of Classification Search
None
See application file for complete search history.

(56) References Cited

U.S. PATENT DOCUMENTS

| 7,986,425 | B2* | 7/2011 | Nakaota | G06F 3/1231 |
| | | | | 358/1.15 |
| 2009/0103126 | A1* | 4/2009 | Park | H04L 61/2015 |
| | | | | 358/1.15 |
| 2011/0238823 | A1* | 9/2011 | Yamada | G06F 3/1285 |
| | | | | 709/224 |
| 2016/0253134 | A1* | 9/2016 | Nakai | H04L 61/6059 |
| | | | | 358/1.15 |
| 2018/0253266 | A1* | 9/2018 | Tamura | G06F 3/1236 |
| 2018/0267751 | A1* | 9/2018 | Sato | G06F 3/1231 |

FOREIGN PATENT DOCUMENTS

JP 2012-039542 A 2/2012

* cited by examiner

*Primary Examiner* — Haris Sabah
(74) *Attorney, Agent, or Firm* — Workman Nydegger

(57) ABSTRACT

A method of controlling a PC setting a first IP address for a printer having a network segment different from a network segment of the PC, the method including: setting a second IP address for the PC, searching for the printer having an IP address before a change by communication using the second IP address and transmitting a network setting command including the first IP address to the searched printer to set the first IP address, generating a third IP address having a network segment identical to a network segment of the first IP address set for the printer, setting the generated third IP address for the PC, and transmitting a printer setting command to the printer using the third IP address.

9 Claims, 8 Drawing Sheets

FIG. 4

| MAIN SCREEN | | | | | | | |
|---|---|---|---|---|---|---|---|
| | | | | | AUTOMATIC SETTING | SETTING START | |
| MODEL NAME | IP ADDRESS | MAC ADDRESS | SERIAL NUMBER | LOCATION | ADMINISTRATOR NAME | PRINTER SETTING | |
| Printer 1 | 10.8.101.111 | 12:34:56:78:AB:CD | X0001 | Office 1 | Admin | SPECIFIED | |
| Printer 1 | 10.8.101.112 | | | Office 1 | Admin | SPECIFIED | |
| Printer 1 | 10.8.101.113 | | | Office 1 | Admin | UNSPECIFIED | |

METHOD OF CONTROLLING INFORMATION PROCESSING APPARATUS AND STORAGE MEDIUM STORING PROGRAM TO SET AN IP ADDRESS FOR A DEVICE SUITABLE FOR NETWORK ENVIRONMENT

The present application is based on, and claims priority from JP Application Serial Number 2019-111747, filed Jun. 17, 2019, the disclosure of which is hereby incorporated by reference herein in its entirety.

BACKGROUND

1. Technical Field

The present disclosure relates to a method of controlling an information processing apparatus and a storage medium storing a program.

2. Related Art

To date, at the time of using a device, such as a printer, in a network environment, it is necessary to set an IP address for the device. A technique for assigning an IP address to a device to be connected to a network is disclosed in, for example, JP-A-2012-039542.

A vendor that provides such a kind of device commonly performs various setting operations, such as assigning the device an IP address suitable for the network environment of a customer, and provides the customer with the device having been assigned the IP address. In this manner, since a customer is provided with a device having already been assigned an IP address, it is possible for the customer to use the device only by connecting the provided device to a network.

With related-art techniques, when a customer has a plurality of network segments in a network environment and connects a large number of devices to different network segments, it takes time and effort to perform setting operations of the devices.

SUMMARY

According to an aspect of the present disclosure, there is provided a method of controlling an information processing apparatus setting a first IP address for a device having a network segment different from a network segment of the information processing apparatus, the method including: setting a second IP address for the information processing apparatus; searching for the device having an IP address before a change by communication using the second IP address and transmitting a command including the first IP address to the found device to set the first IP address; generating a third IP address having a network segment identical to a network segment of the first IP address set for the device and setting the generated third IP address for the information processing apparatus; and communicating with the device using the third IP address.

According to another aspect of the present disclosure, there is provided a non-transitory processor-readable storage medium storing a program causing a processor of an information processing apparatus setting a first IP address for a device having a network segment different from a network segment of the information processing apparatus to execute steps including: setting a second IP address for the information processing apparatus; searching for the device having an IP address before a change by communication using the second IP address and transmitting a command including the first IP address to the found device to set the first IP address; generating a third IP address having a network segment identical to a network segment of the first IP address set for the device and setting the generated third IP address for the information processing apparatus; and communicating with the device using the third IP address.

BRIEF DESCRIPTION OF THE DRAWINGS

FIG. 4 is a diagram illustrating a display example of a main screen.

DESCRIPTION OF EXEMPLARY EMBODIMENTS

Figure 1:
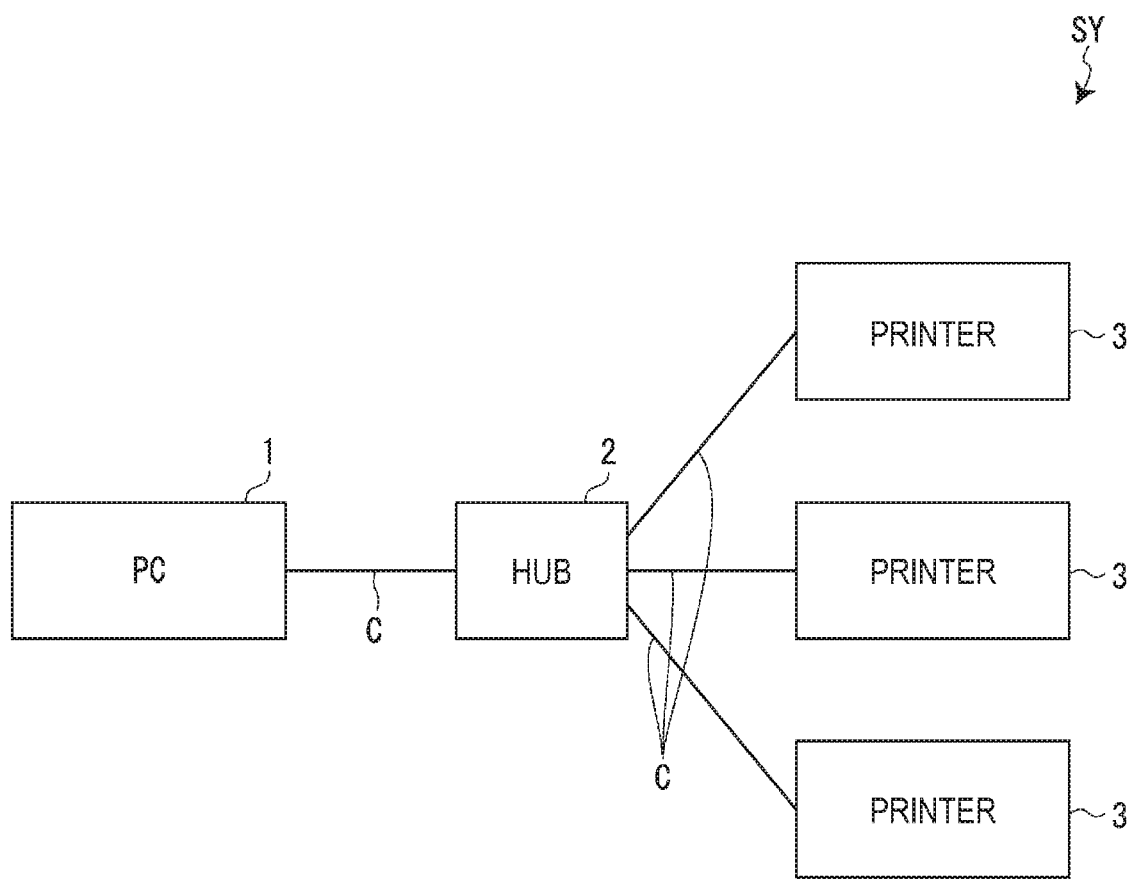
FIG. 1 is a system configuration diagram of a network system.

In the following, descriptions will be given of a method of controlling an information processing apparatus according to an embodiment and a storage medium storing a program with reference to the accompanying drawings. FIG. 1 is the system configuration diagram of a network system SY. The network system SY includes a PC (personal computer) 1, a hub 2, and a plurality of printers 3. The PC 1 is an example of the "information processing apparatus". Also, the printer 3 is an example of the "device".

The PC 1 and the hub 2, and the hub 2 and the printers 3 are connected via network cables C respectively. The plurality of printers 3 are all network-enabled devices used in a network environment. Also, in the present embodiment, a plurality of printers 3 are of the same model. Also, although not particularly limited, the printers 3 are receipt printers that print accounting receipts based on the print data transmitted from POS (point of sale system) terminals.

The PC 1 performs network setting operation and printer setting operation for the plurality of printers 3. The network setting operation includes setting of an IP address. Also, the printer setting operation includes logo setting and print density setting. The printer setting operation is an example of the "setting related to printing". In the present embodiment, it is assumed that these settings are performed for three printers 3. In this regard, it is not necessary for the three printers 3 to be always connected to the hub 2, and the three printers 3 ought to be connected to the hub 2 at least while the PC 1 is performing the setting processing.

The PC 1 is used, for example, by a vendor who provides the printers 3 to a customer for performing setting operation before providing the printers 3. In this manner, a vendor completes various settings of the printers 3 before providing the printers 3, so that it is possible for customer to immediately use the printers 3 only by connecting the provided printers 3 to a network.

Figure 2:
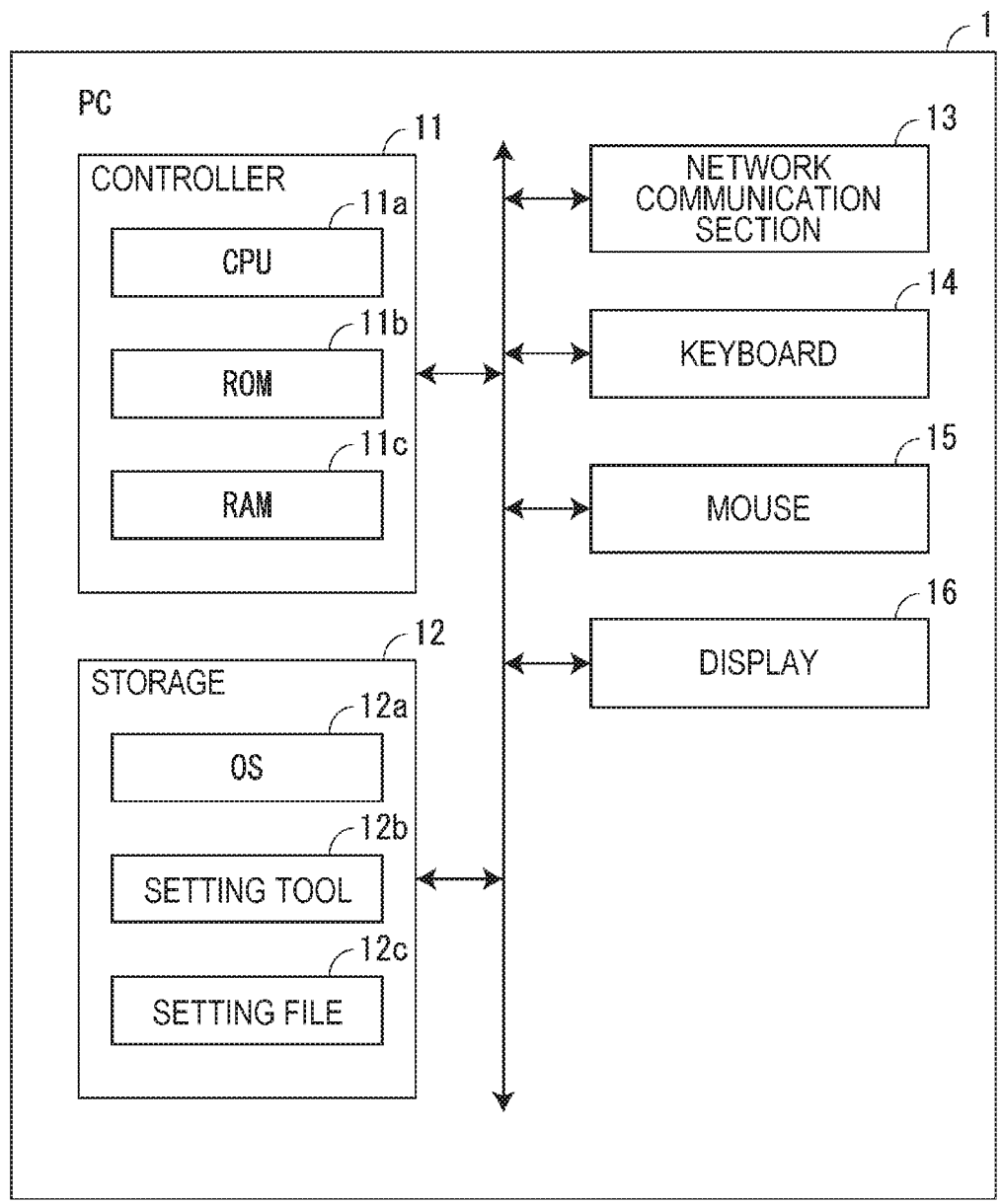
FIG. 2 is a block diagram illustrating the hardware configuration of a PC.

FIG. 2 is a block diagram illustrating the hardware configuration of the PC 1. The PC 1 includes a controller 11, a storage 12, a network communication section 13, a keyboard 14, a mouse 15, and a display 16.

The controller 11 includes a CPU (central processing unit) 11a, a ROM (read only memory) 11b, and a RAM (random access memory) 11c. The CPU 11a is a processor. The ROM 11b is a memory storing a control program. The RAM 11c is a memory used as a work area. The CPU 11a reads various kinds of programs stored in the ROM 11b or the storage 12, loads the programs into the RAM 11c, and executes the programs so as to perform various operations and various kinds of processing.

In this regard, the controller 11 may use a processor other than the CPU 11a. The processor may be constituted by a hardware circuit, for example, an ASIC (application specific integrated circuit). Also, the processor may have a configuration in which one or more CPUs and a hardware circuit, such as an ASIC, operate in combination.

The storage 12 is a memory, for example, an HDD (hard disk drive), and stores an OS (operating system) 12a, a setting tool 12b, and a setting file 12c. The setting tool 12b is an example of the "program".

The OS 12a is basic software for operating various kinds of programs. The setting tool 12b is a program for performing network setting operation and printer setting operation for the printer 3. A main screen D1 (refer to FIG. 4), a printer search screen D2 (refer to FIG. 5), and a printer setting screen D3 (refer to FIG. 6), described later, are screens displayed by the setting tool 12b.

The controller 11 performs various setting operations for the printer 3 in accordance with the setting tool 12b. The details will be described later. Since the setting is performed for the printer 3 having a network segment different from that of the PC 1, the controller 11 performs setting processing while automatically changing the IP address of the PC 1 to have a suitable value. Also, the controller 11 automatically changes the printer 3 to be a setting target and performs setting operations for a plurality of printers 3 in sequence.

Here, a brief description will be given of the flow of changing IP addresses. As one of the network settings, a first IP address is set for the printer 3. After the controller 11 first sets a second IP address for the IP address of the PC 1, which is an initial IP address, the controller 11 performs network setting operation for the printer 3. After completing the network setting operation, the controller 11 sets a third IP address having the same network segment as that of the IP address of the printer 3 for the IP address of the PC 1, and then performs printer setting operation for the printer 3. Further, after the controller 11 completes the setting operations of all the printers 3 to be the setting targets, the controller 11 sets the original IP address for the IP address of the PC 1, that is to say, the controller 11 sets a fourth IP address, which is the IP address before setting the second IP address.

In this regard, the reason why a second IP address is set for the IP address of the PC 1 is to perform network setting operation for the printer 3 in an initial setting state. Also, the reason why the IP address of the PC 1 is set to a third IP address is to perform printer setting operation that is not possible unless the network segments match. Also, the reason why the IP address of the PC 1 is set to a fourth IP address is to return the PC 1 to the previous state before the setting operation for the printer 3 is performed.

In this regard, it is assumed that the fourth IP address is stored in the ROM 11b. Also, it is assumed that a subnet mask corresponding to the fourth IP address is also stored in the ROM 11b.

On the other hand, the controller 11 captures the setting file 12c into the setting tool 12b and performs various setting operations for the printer 3. The setting file 12c is a file that stores setting information 41 (refer to FIG. 3) to be set for the printer 3, and is, for example, a CSV (comma-separated values) file.

Figure 3:
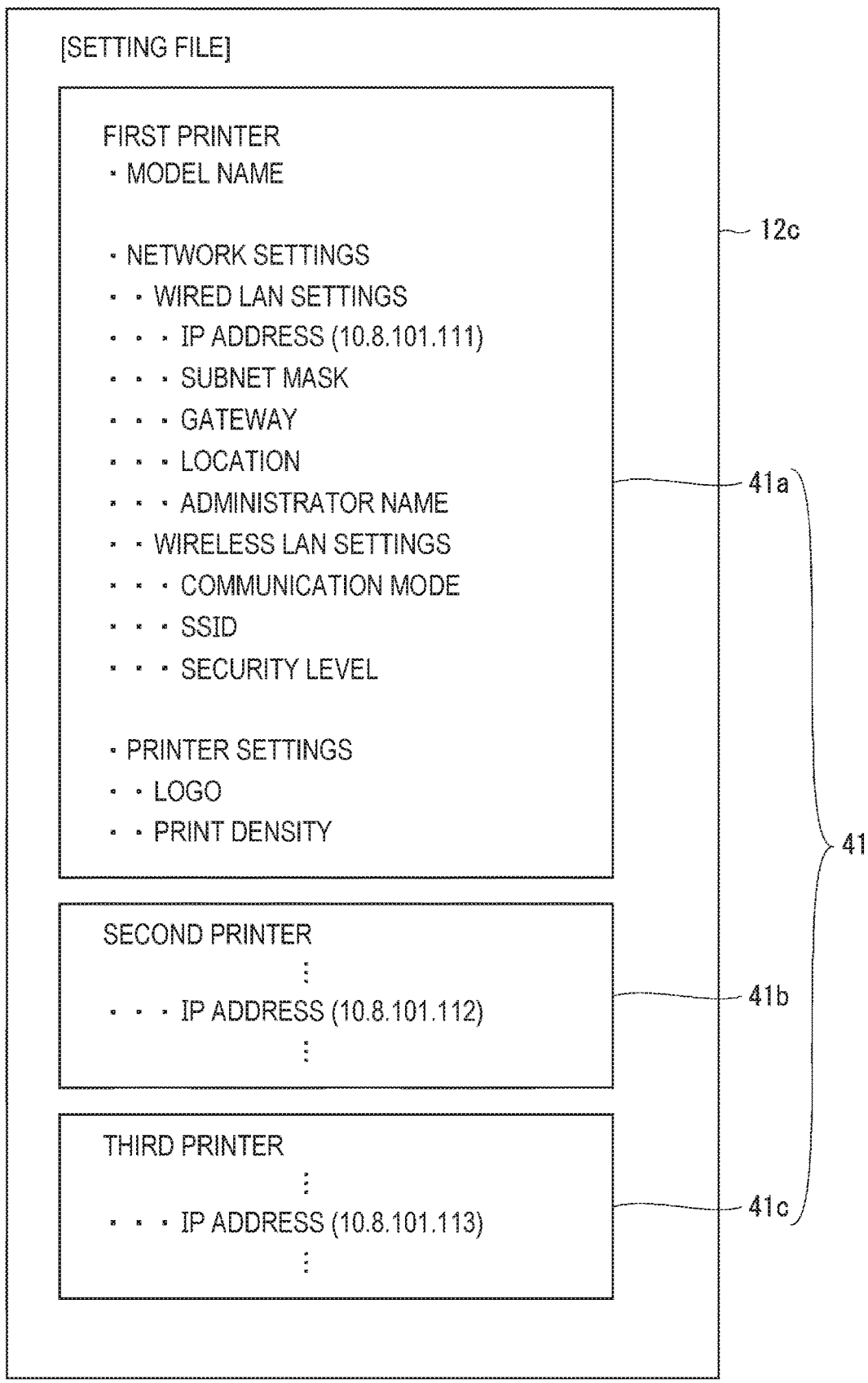
FIG. 3 is a diagram illustrating an example of a setting file.

FIG. 3 is a diagram illustrating an example of information stored as the setting file 12c. The setting file 12c includes setting information 41 to be set for each of the printers 3. In the example in FIG. 3, the setting file 12c includes first setting information 41a to be set for the first one out of the three printers 3, second setting information 41b to be set for the second one, and third setting information 41c for the third one.

For example, the first setting information 41a includes a model name, information on network setting, and information on a printer.

The information on network setting includes information on wired LAN setting and information on wireless LAN setting. The information on wired LAN setting is, for example, information on the setting of Ethernet (registered trademark). Also, the information on wireless LAN setting is, for example, information on the setting of Wi-Fi (registered trademark).

The information on wired LAN setting includes an IP address. As illustrated in FIG. 3, when setting operation is performed based on the first setting information 41a, the IP address "10.8.101.111" is set for the printer 3 to be a setting target.

In addition, the information on wired LAN setting includes information on a subnet mask, a gateway, a location, and an administrator name. A subnet mask and a gateway is the information necessary for the printer 3 to perform communication using a wired LAN together with an IP address.

Also, a location is the information indicating the installation site of a printer 3. Also, an administrator name is the name of an administrator who administers a printer 3. In this regard, a location and an administrator name are information also used for a wireless LAN. However, in the present embodiment, the information is stored (set) as one piece of information on wired LAN setting.

The information on wireless LAN setting includes information on a communication mode, an SSID (service set identifier), and a security level. These pieces of information, a communication mode, an SSID, and a security level, are pieces of information necessary for the printer 3 to perform communication in a wireless LAN environment.

On the other hand, information on printer setting includes information on a logo and a print density. A logo is, for example, a logo image of a store where the printer 3 is installed. For information on a logo, for example, the file name of a logo image and image data are stored (set) in the printer 3. In this regard, when information on a logo is stored in the printer 3 as information on the printer setting, a logo image is printed at a predetermined position on an accounting receipt by a logo print command. Also, a print density is information indicating density setting when the printer 3 performs printing.

In this regard, as the information on printer setting, various kinds of information related to the setting of the printer 3, such as color setting, paper setting, and print quality setting, may be stored in addition to a logo and a print density.

In this regard, for the second setting information 41*b* and the third setting information 41*c*, it is possible to store (set) information on the same items as those of the first setting information 41*a* in the printer 3. Accordingly, the detailed description will be omitted. However, when setting is performed based on the second setting information 41*b*, an IP address "10.8.101.112" is set for the printer 3 to be the setting target. Also, when setting is performed based on the third setting information 41*c*, an IP address "10.8.101.113" is set for the printer 3 to be the setting target.

In this regard, each piece of the setting information 41 included in the setting file 12*c* does not necessarily need all the items described above. For example, information on printer setting may not be included in part of the setting information 41.

Figure 6:
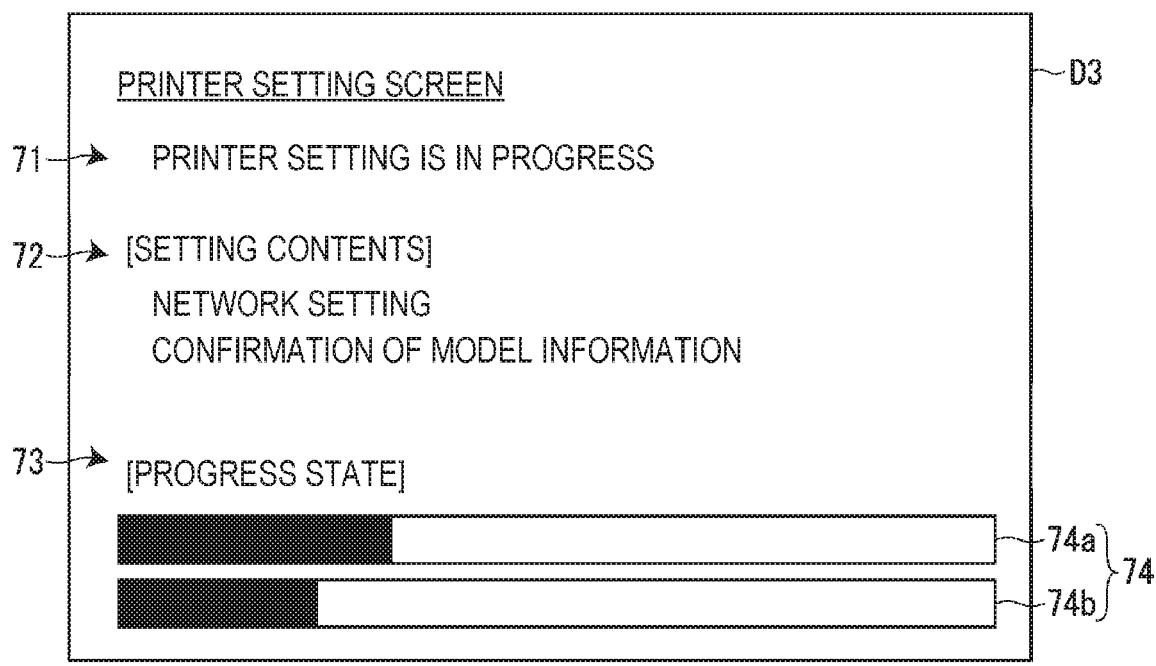
FIG. 6 is a diagram illustrating a display example of a printer setting screen.

Referring back to FIG. 2, the network communication section 13 communicates with the printer 3 via the network cable C and the hub 2. The keyboard 14 and the mouse 15 are used for the user to perform various operations, such as operation of the setting tool 12*b*. The display 16 displays various kinds of information, such as an operation screen of the setting tool 12*b* (FIG. 4 or FIG. 6).

Here, a description will be given of an operation screen of the setting tool 12*b* displayed on the display 16 of the PC 1 with reference to FIG. 4, FIG. 5, and FIG. 6. In the following description, the main body of the processing performed by the controller 11 of the PC 1 is simply denoted as "PC 1". FIG. 4 is a diagram illustrating a display example of the main screen D1. FIG. 4 is a display example of the main screen D1 when the PC 1 has started the setting tool 12*b* and has captured the setting file 12*c* into the setting tool 12*b*. The PC 1 displays an automatic setting button 51, a setting start button 52, and a setting information list 53 on the main screen D1.

The automatic setting button 51 is a button to be selected when the automatic setting processing is performed. The automatic setting processing is the processing in which the PC 1 searches for a printer 3 connected to a network, and automatic setting is performed on the detected printers 3 one by one. In this regard, the three printers 3 may be connected to the hub 2 in advance before performing the automatic setting processing, or the three printers 3 may be connected to the hub 2 in sequence while performing the automatic setting processing.

On the other hand, the setting start button 52 is a button to be selected when manual setting processing is performed. The manual setting processing is the processing in which a user manually selects a printer 3 to be a setting target and performs setting. For example, when an error occurs in the automatic setting processing, the user selects the setting start button 52, manually selects a printer 3 to be the setting target, and performs the setting for the printer 3.

In the setting information list 53, the setting information 41 of each of the printers 3 is displayed based on the captured setting file 12*c* in a corresponding row. FIG. 4 illustrates a display example of the setting information 41 based on the setting file 12*c* illustrated in FIG. 3. Specifically, the PC 1 displays first row data 54*a* based on the first setting information 41*a*, displays second row data 54*b* based on the second setting information 41*b*, and displays third row data 54*c* based on the third setting information 41*c*.

The PC 1 displays a model name, an IP address, a MAC address, a serial number, a location, an administrator name, and a printer setting as items of row data 54 in the setting information list 53. Here, the PC 1 displays a character string, "specified" or "unspecified" in the field of printer setting. When information on printer setting is included in the setting information 41 corresponding to the row data 54, the PC 1 displays the character string, "specified" in the field of printer setting, whereas when information on printer setting is not included in the setting information 41, the PC 1 displays the character string, "unspecified" in the field of printer setting.

In this regard, the PC 1 sets the setting information 41 in sequence in accordance with the display order of the row data 54 displayed in the setting information list 53. FIG. 4 illustrates the state in which setting of the first setting information 41*a* corresponding to the first row data 54*a* has been completed, and setting of the second setting information 41*b* corresponding to the second row data 54*b* is currently in progress. That is to say, the PC 1 displays the row data 54 corresponding to the setting information 41 being set in a display mode distinguishable from the other row data 54. In the example in FIG. 4, the PC 1 displays row data 54 corresponding to the setting information 41 in progress of setting in a black and white inverted manner.

In this regard, the PC 1 displays information in the fields of MAC address and serial number for the row data 54 corresponding to the setting information 41 for which setting has been completed. The PC 1 displays the information on the MAC address and the serial number based on the setting values obtained from the printer 3 targeted for setting.

Figure 5:
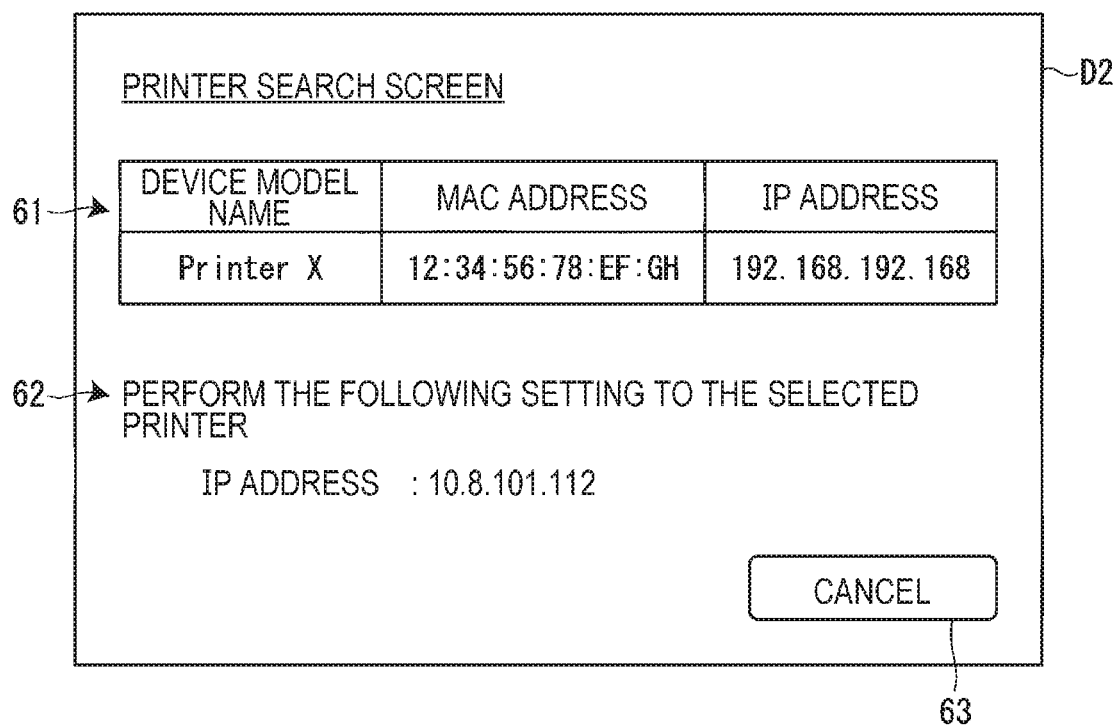
FIG. 5 is a diagram illustrating a display example of a printer search screen.

FIG. 5 is a diagram illustrating a display example of the printer search screen D2. The printer search screen D2 is a screen when the automatic setting button 51 is selected on the main screen D1 and while searching for a printer 3 is in progress. The PC 1 displays a printer display field 61, a setting announcement display field 62, and a cancel button 63 on the printer search screen D2.

When the PC 1 detects a printer 3 in the automatic setting processing, the PC 1 displays the information on the detected printer 3 in the printer display field 61. The PC 1 displays information on a device model name, a MAC address, and an IP address in the printer display field 61. These pieces of the information is the information obtained from the detected printer. The example in FIG. 5 illustrates the case where a printer 3 having 192.168.192.168 in the factory shipment state has been detected, and thus an initial value of "192.168.192.168" is displayed as an IP address.

The PC 1 displays in the setting announcement display field 62 an IP address to be set for the detected printer 3, that is to say, a printer 3 displayed in the printer display field 61. The IP address is an IP address that has been displayed in the row data 54 (the second row data 54*b* in this example) corresponding to the setting information 41 being set on the main screen D1.

In this regard, in the example in FIG. 5, only the IP address is displayed in the setting announcement display field 62. However, the information on the other items included the setting information 41 being set (the second setting information 41*b* in this example) may be displayed.

A cancel button 63 is a button to be selected when searching a printer 3 is stopped. When the cancel button 63 is selected while the automatic setting processing is being executed, the PC 1 stops the automatic setting processing at that point in time. For example, when the user refers to the printer display field 61 and the setting announcement display field 62, and determines that the combination of a printer 3 to be set and an IP address to be set is not suitable, the user selects the cancel button 63.

FIG. 6 is a diagram illustrating a display example of the printer setting screen D3. The printer setting screen D3 is a screen displayed after the printer search screen D2 is displayed and with the start of setting the printer 3. The PC 1 displays a message 71, a setting contents display field 72, and a progress state display field 73 on the printer setting screen D3. The message 71 displays that setting for the printer 3 is in progress.

The PC 1 displays the contents set for the printer 3 in the setting contents display field 72. As described above, the PC 1 performs various setting operations for the printers 3 while changing IP addresses, and thus performs network setting operation using the second IP address and performs printer setting operation using the third IP address. The printer setting screen D3 illustrated in FIG. 6 is a screen which is displayed while network setting operation is performed using the second IP address. Accordingly, the PC 1 displays a character string of "network setting" in the setting contents display field 72. Also, the PC 1 confirms the model information of the printer 3 using the second IP address in the same manner as "network setting". Accordingly, the PC 1 displays a character string of "confirmation of model information" in the setting contents display field 72.

In the progress state display field 73, a first progress bar 74a that represents the progress state on "network setting" and a second progress bar 74b that represents the progress state on the "confirmation of model information" are displayed. The display of each of the progress bars 74 changes every second in accordance with the progress state of each processing.

In this regard, after the PC 1 completes the confirmation of the network setting and the model information for the printer 3, the printer 3 is restarted. While the printer 3 is restarted, the PC 1 sets its IP address to the third IP address, and performs printer setting operation using the third IP address for the restarted printer 3. The PC 1 displays the printer setting screen D3 while performing the printer setting. Note that, in this case, a character string of "printer setting" is displayed in the setting contents display field 72.

Also, after the PC 1 completes the printer setting for the printer 3, the PC 1 displays the main screen D1, reflects a MAC address and a serial number, which are parts of the setting contents, on the setting information list 53, and changes row data 54 corresponding to the setting information 41 being set to the next row. After that, the PC 1 displays the printer search screen D2 and searches for the next printer 3.

Figure 7:
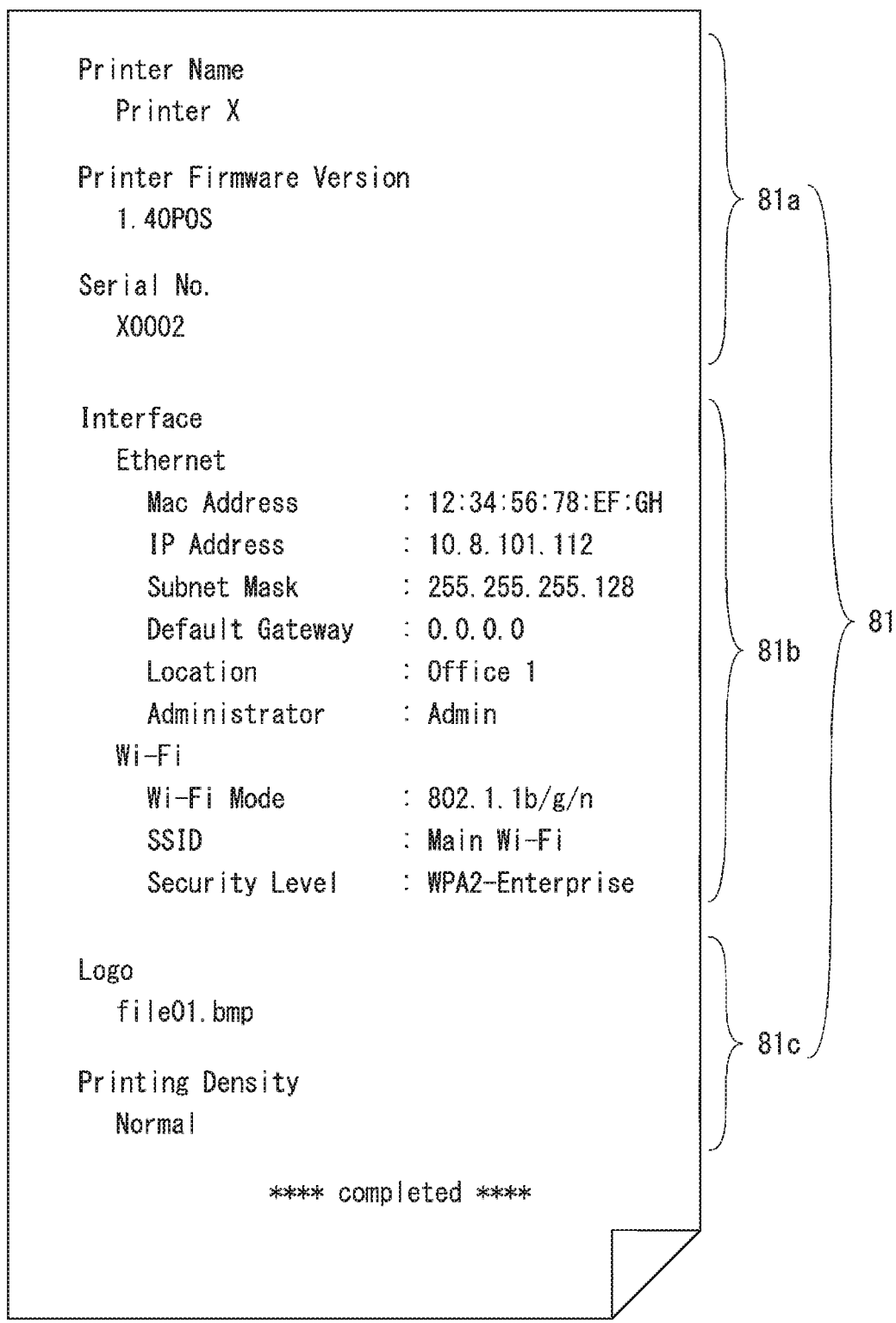
FIG. 7 is a diagram illustrating a print example of a setting result.

FIG. 7 is a diagram illustrating an example of a setting result 81 to be printed by the printer 3 after the setting for the printer 3 is completed. The setting result 81 is printed on a receipt paper, which is a print medium of an accounting receipt. Also, the setting result 81 is printed at the time of setting completion of a printer 3 by the printer 3 for each printer 3.

The setting result 81 includes a first setting result 81a, a second setting result 81b, and a third setting result 81c. The first setting result 81a includes a setting result of a device model name, a firmware version, and a serial number. These pieces of information is the information obtained from the memory of each of the printers 3.

The second setting result 81b is a setting result on "network setting" and includes a setting result on wired LAN setting and wireless LAN setting. The setting result on wired LAN setting includes a setting result of a MAC address, an IP address, a subnet mask, a gateway, a location, and an administrator name. Also, the setting result on wireless LAN setting includes a setting result of a communication mode, an SSID, and a security level. In this regard, of the second setting result 81b, a MAC address is information obtained from the printer 3, and other information than that is information set based on the setting information 41.

The third setting result 81c is a setting result on "printer setting" and includes a setting result on a logo and a setting result on a print density. These pieces of information is the information set based on the setting information 41. It is possible for a user to confirm the setting contents set for the printer 3 from a printed matter printed by the setting result 81 illustrated in FIG. 7.

Figure 8:
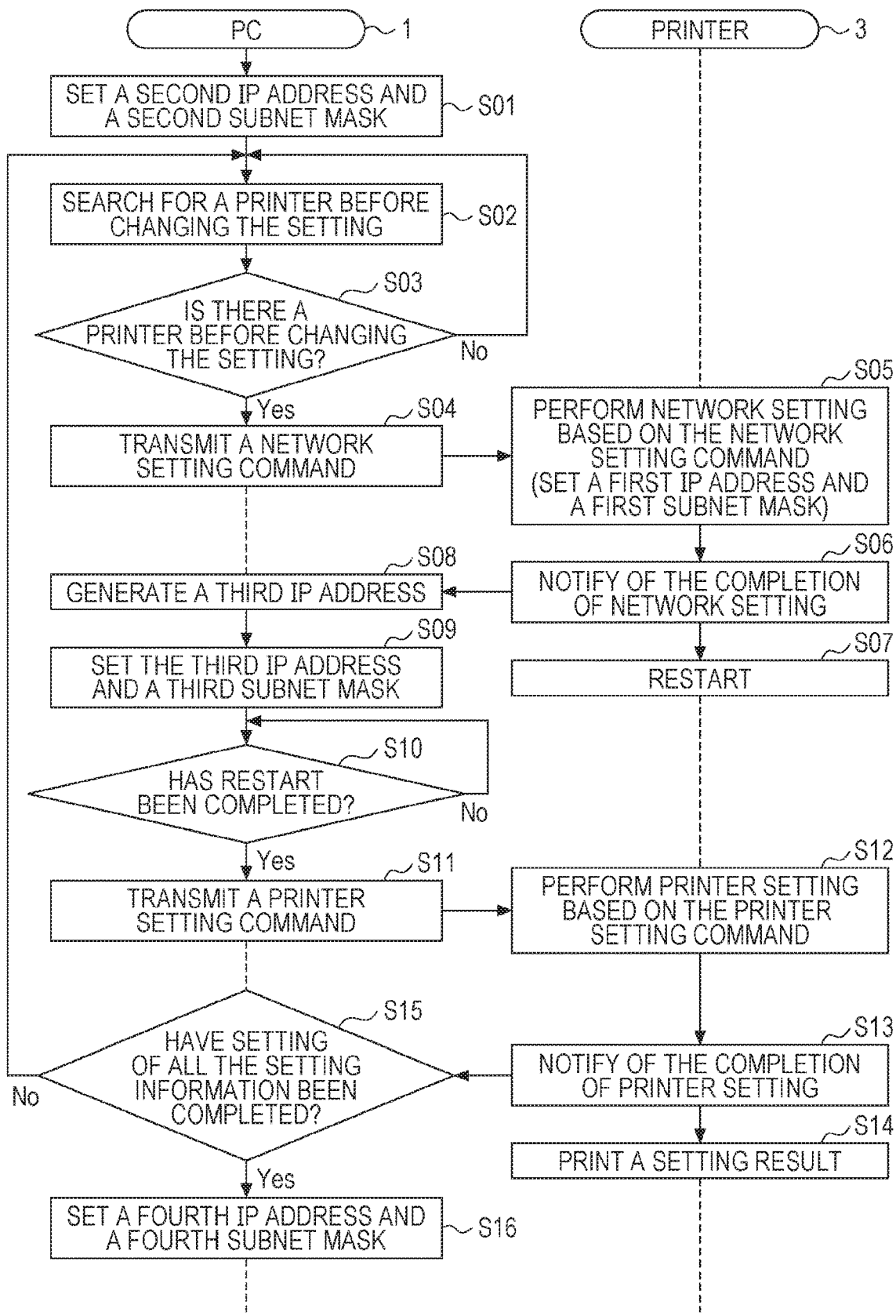
FIG. 8 is a flowchart illustrating the flow of automatic setting processing.

FIG. 8 is a flowchart illustrating the processing flow of the automatic setting performed by the PC 1. FIG. 8 also illustrates the operation of the printer 3, which is involved with the automatic setting processing of the PC 1. Here, a description will be given of the case when the PC 1 performs not only network setting for the printer 3, but also printer setting. The PC 1 starts automatic setting processing, which is triggered by the selection of the automatic setting button 51 on the main screen D1.

In S01, the PC 1 sets its own IP address and subnet mask to a second IP address and a second subnet mask respectively. The PC 1 assumes that a printer 3 to be the setting target has an IP address of "192.168.192.168" and a subnet mask of "255.255.255.0", and thus sets, for example, the second IP address to "192.168.192.100" and sets the second subnet mask to "255.255.255.0". In this regard, the second IP address and the second subnet mask are pieces of information set in advance as a definition file in the setting tool 12b.

In S02, the PC 1 searches for a printer 3 before setting a change. The printer 3 before setting a change is an example of the "device having an IP address before a change". For a model having the factory shipment state of DHCP (Dynamic Host Configuration Protocol), the PC 1 determines that a printer 3 having the DHCP setting is a printer 3 before setting a change. Also, for a model having the factory shipment state of 192.168.192.168, the PC 1 determines that a printer 3 having the IP address of "192.168.192.168" is a printer 3 before setting a change.

In S03, the PC 1 determines whether there is a printer 3 before setting a change or not. When the PC 1 determines that there is a printer 3 before setting a change, the processing proceeds to S04. Also, when the PC 1 determines that there are no printers 3 before setting a change, the processing returns to S02.

In S04, the PC 1 transmits a network setting command to the printer 3. The network setting command includes information on the network setting in the setting information 41. The information on the network setting includes a first IP address and a first subnet mask to be set for the printer 3 to be a setting target.

In S05, the printer 3 performs network setting based on the reception of the network setting command transmitted from the PC 1. Here, it is assumed that, for example, the first IP address is set to "10.8.101.111", and the first subnet mask is set to "255.255.255.128".

In S06, when the network setting is completed, the printer 3 notifies the PC 1 of the completion of the network setting.

In S07, the printer 3 is restarted. In this regard, restarting may be performed not automatically with the network setting completion of the printer 3, but may be performed by obtaining a restart instruction from the PC 1 after notifying the PC 1 of the network setting completion.

In S08, when the PC 1 receives the network setting completion from the printer 3, the PC 1 generates a third IP address in accordance with a predetermined rule. The third IP address is an IP address having the same network segment as that of the first IP address for the printer 3.

Here, a description will be given of an example of a method of generating a third IP address. The PC 1 generates a third IP address based on the fourth value produced by dividing the subnet mask for the printer 3 into four groups. Specifically, the PC 1 generates a third IP address by performing addition or subtraction of a fixed value to or from the fourth value of the first IP address set for the printer 3 such that the subnet mask set for the printer 3 approaches half the value produced by subtracting the fourth value of the four groups from "256". The fixed value is, for example, "10".

As described above, when the first subnet mask set for the printer 3 is "255.255.255.128", the half the value produced by subtracting the fourth value, "128" from "256" becomes "64". Also, since the first IP address set for the printer 3 is "10.8.101.111", the PC 1 subtracts "10" so that "111" approaches "64", and generates "10.8.101.101" as a third IP address. In this regard, the fixed value "10" is a value produced based on the fact that the number of printers 3 installed in one store is usually less than 10. That is to say, by performing addition or subtraction of the fixed value "10" to generate a third IP address set for the PC 1, it is possible to prevent the first IP address set for the printer 3 from having the same vale as that of the host section.

In this regard, the fixed value "10" is an example, and may be another value. However, it is desirable that the fixed value be set based on the number of printers 3 installed in one store and the available range specified by the subnet mask set for the printer 3. In this example, since half the value produced by subtracting the fourth value "128" of the first subnet mask "255.255.255.128" set for the printer 3 from "256" becomes "64", the available range is from "1" to "63". Also, since the number of printers 3 is three, it is desirable to have a value larger than the number of the printers 3, "3" and within the available range, that is to say, it is desirable that a fixed value be set in the range from "4" to "63". That is to say, it is desirable that the host section of the third IP address be set in the range of not overlapping the "1" bit portion of the subnet mask. However, it is assumed that the printers 3 to be installed in one store have consecutive numbers in the host section of the first IP address.

In S09, the PC 1 sets its own IP address and subnet mask to the third IP address and the third subnet mask respectively. The PC 1 sets the third IP address to "10.8.101.101" set in S08, and sets the third subnet mask to "255.255.255.128", which is the same as the first subnet mask.

In S10, the PC 1 determines whether or not restarting of the printer 3 has been completed. The PC 1 performs, for example, polling to the printer 3 periodically. When receiving a normal response from the printer 3, the PC 1 determines that the restarting has been completed. When the PC 1 determines that the printer 3 has not been completed, the determination of S10 is repeated.

In this regard, in S10, the PC 1 may determine whether or not restarting of the printer 3 has been completed not by performing polling to the printer 3, but by receiving a notification transmitted from the printer 3 after restarting.

In S11, the PC 1 transmits a printer setting command to the printer 3. The printer setting command includes information on the printer setting in the setting information 41 and a print instruction. The information on printer setting includes a logo and a print density. Also, a print instruction is an instruction for the printer 3 to print a setting result 81 on the network setting and the printer setting.

In S12, the printer 3 performs printer setting based on the reception of a printer setting command transmitted from the PC 1. Specifically, the printer 3 stores the image file of a logo in a predetermined storage area in the storage in the printer 3 and sets the print density to a set density.

In S13, when the printer setting is completed, the printer 3 notifies the PC 1 of completion of the printer setting.

In S14, the printer 3 prints the setting result 81 of the network setting and the printer setting stored in the memory (refer to FIG. 7).

In S15, when the PC 1 receives a notification of the completion of the printer setting from the printer 3, the PC 1 determines whether or not setting of the setting information 41 corresponding to the entire row data 54 displayed in the setting information list 53 has been completed. When the PC 1 determines that setting of the setting information 41 corresponding to the entire row data 54 has been completed, the processing proceeds to S16. Also, when the PC 1 determines that setting of the setting information 41 corresponding to the entire row data 54 has not been completed, the processing returns to S02.

In S16, the PC 1 sets its IP address and subnet mask to a fourth IP address and a fourth subnet mask respectively stored in the ROM 11*b*. The fourth IP address and the fourth subnet mask are the IP address and the subnet mask that have been set for the PC 1 before starting the automatic setting processing.

In this regard, in FIG. 8, a description has been given of the case where the printer setting is performed for the printer 3. However, when printer setting is not performed, that is to say, when the information on the printer setting is not included in the setting information 41, the PC 1 performs a print instruction on the printer 3 in S11 instead of transmitting a printer setting command to the printer 3. The printer 3 prints the setting result 81 of the network setting and the printer setting stored in the storage based on the print instruction. Also, the PC 1 performs the print instruction on the printer 3, and then the processing proceeds to S15.

As described above, for a printer 3 having a network segment different from that of the PC 1, the PC 1 according to the present embodiment is able to set its own IP address to the second IP address and set the first IP address for the printer 3. Also, after the PC 1 sets the first IP address for the printer 3, it is possible to set its own IP address to a third IP address having the same network segment as that of the first IP address, and communicate with the printer 3 using the third IP address.

In this manner, it is possible for the PC 1 to set a first IP address for a printer 3 having a different network segment, and the like while automatically changing its own IP address. Accordingly, when a plurality of network segments are included in the network environment of a customer, and many printers 3 have to be connected to a plurality of network segments, it is possible for the user to perform setting of the printer 3 without taking much time.

Also, it is possible for the PC 1 to perform printer setting for the printer 3 having a different network segment by the communication using the third IP address. Also, the PC 1 causes the printer 3 to print the setting result 81 of the network setting and the printer setting, and thus it is possible to confirm the setting contents of the printer 3 from the setting result 81.

In this regard, it is possible to employ the following variations in addition to the embodiment described above.

Variation 1

In the embodiment described above, the printer 3 is given as an example of a device. However, various settings may be performed for electronic devices other than a printer 3, such as a scanner or a complex machine.

Variation 2

In the embodiment described above, the printer 3 notifies the PC 1 of completion of the printer setting, and then the printer 3 itself prints the setting result 81 of the network setting and the printer setting (refer to S13 and S14 in FIG. 8). However, after the printer 3 notifies the PC 1 of completion of the printer setting, the printer 3 may print the setting result 81 upon receiving a print instruction from the PC 1. In this case, after the PC 1 receives completion of the printer setting from the printer 3, the PC 1 ought to give a print instruction to the printer 3.

Variation 3

The printer 3 may notifies the PC 1 of a setting value related to the network setting stored in the memory as the notification of completion of the network setting (refer to S06 in FIG. 8). Also, the printer 3 may notifies the PC 1 of a setting value related to the printer setting as the notification of completion of the printer setting (refer to S13 in FIG. 8). Against these, the PC 1 matches the notified setting value with the setting information 41, and may determine whether or not the setting has normally been performed for the printer 3. When the PC 1 determines that the setting has not normally been performed for the printer 3, it is desirable for the PC 1 to perform error notification, such as displaying a setting item that is inconsistent on the operation screen of the setting tool 12b.

Variation 4

The scope of right of the disclosure includes a method of executing each processing of the PC 1 and the printer 3 described in the embodiment described above and each variation, and a recording medium readable by a computer or a processor that stores a program for executing each processing, such as the setting tool 12b. Also, instead of the PC 1, a tablet terminal, a smartphone, or the like may be used as the information processing apparatus. Also, it is possible to provide the above-described setting tool 12b, and the like as a program. Also, it is possible to store the program in various recording media (a CD-ROM, a flash memory, or the like) and provide the recording media. In addition, various changes may be made without departing from the spirit and scope of the disclosure.

APPENDIXES

In the following, a description will be added of a method of controlling an information processing apparatus and a storage medium storing a program.

A method of controlling an information processing apparatus 1 setting a first IP address for a device 3 having a network segment different from that of the information processing apparatus 1, the method including: setting a second IP address for the information processing apparatus 1; searching for the device 3 having an IP address before a change by communication using the second IP address and transmitting a command including the first IP address to the found device 3 to set the first IP address; generating a third IP address having a network segment identical to that of the first IP address set for the device 3 and setting the generated third IP address for the information processing apparatus 1; and communicating with the device 3 using the third IP address.

The program 12b stored in a storage medium causes the controller 11 of the information processing apparatus 1 setting a first IP address for the device 3 having a network segment different from that of the information processing apparatus 1 to set a second IP address for the information processing apparatus 1, search for a device 3 having an IP address before a change by communication using a second IP address, transmit a command including the first IP address to the found device 3 to set the first IP address, generate a third IP address having the same network segment as that of the first IP address set for the device 3, set the generated third IP address for the information processing apparatus 1, and communicate with the device 3 using the third IP address.

With this configuration, it is possible for the information processing apparatus 1 to set its IP address to a second IP address, and to set a first IP address for a device 3 when the information processing apparatus 1 has a network segment different from that of the device 3. Also, after setting the first IP address for the device 3, it is possible for the information processing apparatus 1 to set its own IP address to a third IP address having the same network segment as that of the first IP address, and communicate with the device 3 using the third IP address. In this manner, since it is possible for the information processing apparatus 1 to set a first IP address for a device 3 having a different network segment while automatically changing its own IP address, and the like, it is possible to easily perform setting of the device 3 when many devices 3 are connected to a plurality of network segments.

In the method of controlling the information processing apparatus 1 described above, after setting the first IP address, the device 3 is restarted, and the setting the third IP address is performed when the device 3 is being restarted.

With this configuration, it is possible for the information processing apparatus 1 to set its own IP address to a third IP address using a time period while the device 3 is restarted.

In the method of controlling the information processing apparatus 1 described above, the device 3 is a printer 3, setting related to printing for the printer 3 is performed by communication using the third IP address, and causing the printer 3 to print the first IP address and the settings related to the printing is performed.

With this configuration, it is possible for the information processing apparatus 1 to perform setting related to printing for the printer 3 by communication using the third IP address. Also, sine the information processing apparatus 1 causes the printer 3 to print the first IP address and the settings related to printing, it is possible for the user to confirm the setting contents of the printer 3 from the print result.

In the method of controlling the information processing apparatus 1 described above, the generating the third IP address is performed based on a fourth value produced by dividing a subnet mask set for the device 3 into four groups.

With this configuration, it is possible for the information processing apparatus 1 to set the third IP address to a suitable value based on the fourth value produced by dividing the subnet mask set for the device 3 into four groups.

In the method of controlling the information processing apparatus 1 described above, storing a fourth IP address being an IP address having been set for the information processing apparatus 1 before the setting the second IP address is performed, and after communicating with the device 3 using the third IP address, setting the fourth IP address for the information processing apparatus is performed.

With this configuration, after communicating with the device 3, it is possible for the information processing apparatus 1 to return its own IP address to the fourth IP address having been set for the information processing apparatus 1 before setting the second IP address.

What is claimed is:

1. A method of controlling an information processing apparatus setting a first IP address for a device initially having a network segment different from a network segment of the information processing apparatus, the method comprising:
   changing an initial apparatus IP address for the information processing apparatus to a second IP address;
   searching for the device having an initial device IP address that has not yet been set by the information processing apparatus, the searching occurring by the information processing apparatus communicating using the second IP address and transmitting a command including the first IP address to the device to set the first IP address for the device, wherein after setting the first IP address, the device is restarted;
   generating a third IP address having a network segment identical to a network segment of the first IP address set for the device, and setting the generated third IP address for the information processing apparatus, wherein the setting of the third IP address is performed when the device is being restarted; and
   communicating with the device using the third IP address.

2. The method of controlling an information processing apparatus according to claim 1, wherein
   the device is a printer, the method further comprising:
   performing a print setting for the printer by communication using the third IP address, and
   causing the printer to print the first IP address and the print setting.

3. The method of controlling an information processing apparatus according to claim 1, wherein
   the generating the third IP address is performed based on a fourth value produced by dividing a subnet mask set for the device into four groups.

4. The method of controlling an information processing apparatus according to claim 1, wherein
   storing the initial apparatus IP address before the setting of the second IP address is performed, and
   after communicating with the device using the third IP address, setting the initial apparatus IP address for the information processing apparatus.

5. A non-transitory processor-readable storage medium storing a program causing a processor of an information processing apparatus setting a first IP address for a device initially having a network segment different from a network segment of the information processing apparatus to execute steps comprising:
   changing an initial apparatus IP address for the information processing apparatus to a second IP address;
   searching for the device having an initial device IP address that has not yet been set by the information processing apparatus, the search occurring by the information processing apparatus communicating using the second IP address and transmitting a command including the first IP address to the device to set the first IP address for the device, wherein after setting the first IP address, the device is restarted;
   generating a third IP address having a network segment identical to a network segment of the first IP address set for the device, and setting the generated third IP address for the information processing apparatus, wherein the setting of the third IP address is performed when the device is being restarted; and
   communicating with the device using the third IP address.

6. The non-transitory processor-readable storage medium storing a program according to claim 5, wherein
   the device is a printer,
   the processor further performing a print setting for the printer by communication using the third IP address, and causing the printer to print the first IP address and the print setting.

7. The non-transitory processor-readable storage medium storing a program according to claim 5, wherein
   the generating the third IP address is performed based on a fourth value produced by dividing a subnet mask set for the device into four groups.

8. The non-transitory processor-readable storage medium storing a program according to claim 5, wherein
   storing the initial apparatus IP address before the setting of the second IP address is performed, and
   after communicating with the device using the third IP address, setting the initial apparatus IP address for the information processing apparatus.

9. A method of controlling an information processing apparatus setting a first IP address for a device initially having a network segment different from a network segment of the information processing apparatus, wherein the device is a printer, the method comprising:
   changing an initial apparatus IP address for the information processing apparatus a to a second IP address;
   searching for the device having an initial device IP address that has not yet been set by the information processing apparatus, the searching occurring by the information processing apparatus communicating using the second IP address and transmitting a command including the first IP address to the device to set the first IP address for the device;
   generating a third IP address having a network segment identical to a network segment of the first IP address set for the device, and setting the generated third IP address for the information processing apparatus;
   communicating with the device using the third IP address;
   performing a print setting for the printer by communication using the third IP address, and
   causing the printer to print the first IP address and the print setting.

* * * * *